(12) United States Patent
Saori (10) Patent No.: US 7,253,966 B2
(45) Date of Patent: Aug. 7, 2007

(54) ZOOM LENS SYSTEM

(75) Inventor: Masakazu Saori, Saitama (JP)

(73) Assignee: PENTAX Corporation, Tokyo (JP)

(*) Notice: Subject to any disclaimer, the term of this patent is extended or adjusted under 35 U.S.C. 154(b) by 0 days.

(21) Appl. No.: 11/315,492

(22) Filed: Dec. 23, 2005

(65) Prior Publication Data

US 2006/0139768 A1 Jun. 29, 2006

(30) Foreign Application Priority Data

Dec. 24, 2004 (JP) ............................. 2004-372576

(51) Int. Cl.
*G02B 15/14* (2006.01)
(52) U.S. Cl. ...................... 359/691; 359/676
(58) Field of Classification Search ................ 359/680, 359/676, 686, 689, 691
See application file for complete search history.

(56) References Cited

U.S. PATENT DOCUMENTS

| | | | | |
|---|---|---|---|---|
| 4,142,779 A | * | 3/1979 | Ogawa | 359/680 |
| 4,190,323 A | * | 2/1980 | Ogawa et al. | 359/680 |
| 4,299,453 A | * | 11/1981 | Momiyama et al. | 359/681 |
| 4,329,022 A | * | 5/1982 | Yamaguchi et al. | 359/680 |
| 5,910,860 A | | 6/1999 | Ozaki et al. | |
| 5,936,780 A | * | 8/1999 | Chuang et al. | 359/691 |
| 6,078,435 A | | 6/2000 | Yoneyama | |
| 6,169,635 B1 | | 1/2001 | Ozaki et al. | |
| 6,268,964 B1 | | 7/2001 | Ozaki et al. | |
| 6,757,108 B2 | | 6/2004 | Sensui et al. | |
| 7,016,119 B2 | | 3/2006 | Saori | |
| 2006/0018034 A1 | | 1/2006 | Enomoto | |

FOREIGN PATENT DOCUMENTS

| | | |
|---|---|---|
| JP | 10-282417 | 10/1998 |
| JP | 11-30748 | 2/1999 |
| JP | 11-160619 | 6/1999 |
| JP | 2001-350089 | 12/2001 |
| JP | 2002-82283 | 3/2002 |

OTHER PUBLICATIONS

English language Abstract of JP 10-282417.
English language Abstract of JP 11-30748.
English language Abstract of JP 11-160619.
English language Abstract of JP 2001-350089.
English language Abstract of JP 2002-82283.

* cited by examiner

*Primary Examiner*—Scott J. Sugarman
*Assistant Examiner*—Darryl J. Collins
(74) *Attorney, Agent, or Firm*—Greenblum & Bernstein, P.L.C.

(57) ABSTRACT

A zoom lens system includes a negative first lens group, a variable diaphragm, a positive second lens group, in this order from the object.

Zooming is performed by moving the negative first lens group and the positive second lens group.

The negative first lens group is constituted by at least two negative lens elements and at least two positive lens elements.

The zoom lens system satisfies the following conditions:

$$1.5 < |f1/fw| < 1.8 \quad (1)$$

$$1.0 < |f2/(fw \times ft)^{1/2}| < 1.3 \quad (2)$$

$$1.0 < |f2/f1| < 1.2 \quad (3)$$

wherein
f1 designates the focal length of the negative first lens group;
f2 designates the focal length of the positive second lens group;
fw designates the focal length of the entire the zoom lens system at the short focal length extremity; and
ft designates the focal length of the entire the zoom lens system at the long focal length extremity.

5 Claims, 11 Drawing Sheets

Fig.3

Fig.4A
FNO=1:5.8

— SA
-- SC

-0.5  0.5
SPHERICAL
ABERRATION

THE SINE
CONDITION

Fig.4B
FNO=1:5.8

—— d Line
······ g Line
--- C Line

-0.5  0.5
SPHERICAL
ABERRATION

CHROMATIC
ABERRATION

Fig.4C
W=15.0°

-0.05  0.05
LATERAL
CHROMATIC
ABERRATION

-0.5  0.5
ASTIGMATISM

Fig.4E
W=15.0°

-5 (%) 5
DISTORTION

Fig.5

Fig.6A
FNO=1:3.5

— SA
-- SC

-0.5   0.5
SPHERICAL
ABERRATION

THE SINE
CONDITION

Fig.6B
FNO=1:3.5

-0.5   0.5
SPHERICAL
ABERRATION

CHROMATIC
ABERRATION

Fig.6C
W=38.7°

—— d Line
······ g Line
--- C Line

-0.05  0.05
LATERAL
CHROMATIC
ABERRATION

-0.5   0.5
ASTIGMATISM

Fig.6E
W=38.7°

-5  (%)  5
DISTORTION

Fig.7

Fig.8A
FNO=1:5.8

SPHERICAL
ABERRATION

THE SINE
CONDITION

— SA
- - SC

Fig.8B
FNO=1:5.8

SPHERICAL
ABERRATION

CHROMATIC
ABERRATION

— d Line
······ g Line
- - - C Line

Fig.8C
W=15.0°

LATERAL
CHROMATIC
ABERRATION

Fig.8D
W=15.0°

ASTIGMATISM

DISTORTION

Fig.9

Fig.10A
FNO=1:3.4

— SA
-- SC

-0.5    0.5
SPHERICAL
ABERRATION

THE SINE
CONDITION

Fig.10B
FNO=1:3.4

—— d Line
······· g Line
---- C Line

-0.5    0.5
SPHERICAL
ABERRATION

CHROMATIC
ABERRATION

Fig.10C
W=38.6°

-0.05   0.05
LATERAL
CHROMATIC
ABERRATION

-0.5    0.5
ASTIGMATISM

Fig.10E
W=38.6°

-5  (%)  5
DISTORTION

Fig. 11

Fig.12A  Fig.12B  Fig.12C  Fig.12D  Fig.12E
FNO=1:5.8  FNO=1:5.8  W=15.1°  W=15.1°  W=15.1°

— SA
-- SC

— d Line
···· g Line
---- C Line

— S
-- M

SPHERICAL ABERRATION THE SINE CONDITION

SPHERICAL ABERRATION CHROMATIC ABERRATION

LATERAL CHROMATIC ABERRATION

ASTIGMATISM

DISTORTION

ZOOM LENS SYSTEM

BACKGROUND OF THE INVENTION

1. Field of the Invention

The present invention relates to a zoom lens system suitable for a single lens reflex (SLR) camera, and especially suitable for a digital SLR camera.

2. Description of the Prior Art

A conventional zoom lens system for a SLR camera has a zoom ratio of approximately 2 to 3, and has an angle-of-view covering from a wide-angle range to a telephoto range (a standard zoom lens system). In such a zoom lens system, a retrofocus two-lens-group zoom lens system, including a lens group having a negative refractive power (hereinafter, a negative lens group) and a lens group having a positive refractive power (hereinafter, a positive lens group), in this order from the object, has often been employed.

On the other hand, a conventional zoom lens system of a digital SLR camera has widely employed an imaging device having an image plane which is smaller than that of a silver-halide-film SLR camera with a 35 mm-film format. This is because it has been difficult to increase the size of an imaging device in a digital SLR camera.

Accordingly, the angle-of-view of a digital SLR camera becomes narrower than that of a silver-halide-film SLR camera even in the case where a common exchangeable lens which can also be used with a silver-halide-film SLR camera is mounted thereon. Therefore a zoom lens system of a shorter focal length is preferable and suitable for a digital SLR camera.

Furthermore, in a digital SLR camera, if an attempt is made to design a lens mount and a flange back so that these lens mount and flange back can also be used for a widely-used exchangeable lens of a silver-halide-film SLR camera, a longer back focal distance is required, compared to the focal length of the exchangeable lens.

As explained, it is more difficult for a digital SLR camera to make the focal length at the short focal length extremity shorter than for a silver-halide-film SLR camera to do the same. Moreover, pictures taken by a digital SLR camera have frequently been enlarged and viewed on a personal computer and so forth, though the image plane of an imaging device is smaller than that of a silver-halide-film SLR camera with a 35 mm-film format. Due to these reasons, an imaging device of a digital SLR camera is required to have higher optical performance over the entire image plane of the imaging device.

However, in a conventional retrofocus zoom lens system of the two-lens-group arrangement having a negative lens group and a positive lens group, in this order from the object, the number of lens elements is larger; and miniaturization of the zoom lens system and the cost reduction on manufacturing the zoom lens system have not been sufficient. Moreover, the zoom ratio is less than 2, and the angle-of-view at the short focal length extremity is insufficient, i.e., the focal length cannot be made sufficiently shorter thereat.

The present invention is applied to a two-lens-group zoom lens system which includes a negative first lens group and a positive second lens group, in this order from the object, and has a smaller imaging device. In such a zoom lens system, the objective of the present invention is to provide a zoom lens system of a two-lens-group arrangement with the following features by suitably distributing refractive power over each lens group:

(i) the angle-of-view of 75° or more is attained;

(ii) the zoom ratio is 3 or more;

(iii) the focal length at the short focal length extremity is longer, compared to the back focal distance;

(iv) off-axis aberrations at the short focal length extremity and the on-axis aberrations at the long focal length extremity are maintained in a well balanced manner, while peripheral illumination at the short focal length extremity is secured; and (v) the zoom lens system is miniaturized with lower production costs.

SUMMARY OF THE INVENTION

According to an aspect of the present invention, there is provided a zoom lens system including a negative first lens group, an aperture-diameter variable diaphragm (hereinafter, a variable diaphragm), a positive second lens group, in this order from the object.

Zooming is performed by moving the negative first lens group and the positive second lens group.

The negative first lens group is constituted by at least two negative lens elements and at least two positive lens elements.

The zoom lens system satisfies the following conditions:

$$1.5 < |f1/fw| < 1.8 \tag{1}$$

$$1.0 < f2/(fw \times ft)^{1/2} < 1.3 \tag{2}$$

$$1.0 < |f2/f1| < 1.2 \tag{3}$$

wherein $f1$ designates the focal length of the negative first lens group;

$f2$ designates the focal length of the positive second lens group;

$fw$ designates the focal length of the entire the zoom lens system at the short focal length extremity; and $ft$ designates the focal length of the entire the zoom lens system at the long focal length extremity.

In the zoom lens system of the present invention, it is preferable that a flare-cut diaphragm be provided between the negative first lens group and the variable diaphragm; and it is preferable that upon focusing, the positive second lens group be made immovable and the flare-cut diaphragm be arranged to move together with the negative first lens group.

On the other hand, it is preferable that upon zooming, the flare-cut diaphragm provided between the negative first lens group and the variable diaphragm be made independently movable with respect to the negative first lens group and the variable diaphragm.

The negative first lens group can include a positive first lens element, a negative second lens element, a negative third lens element and a positive fourth lens element, in this order from the object. Furthermore, it is preferable, in the negative first lens group, that a fifth lens element having weaker positive or negative refractive power be provided behind the positive fourth lens element.

The present disclosure relates to subject matter contained in Japanese Patent Application No. 2004-372576 (filed on Dec. 24, 2004) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

Figure 21:
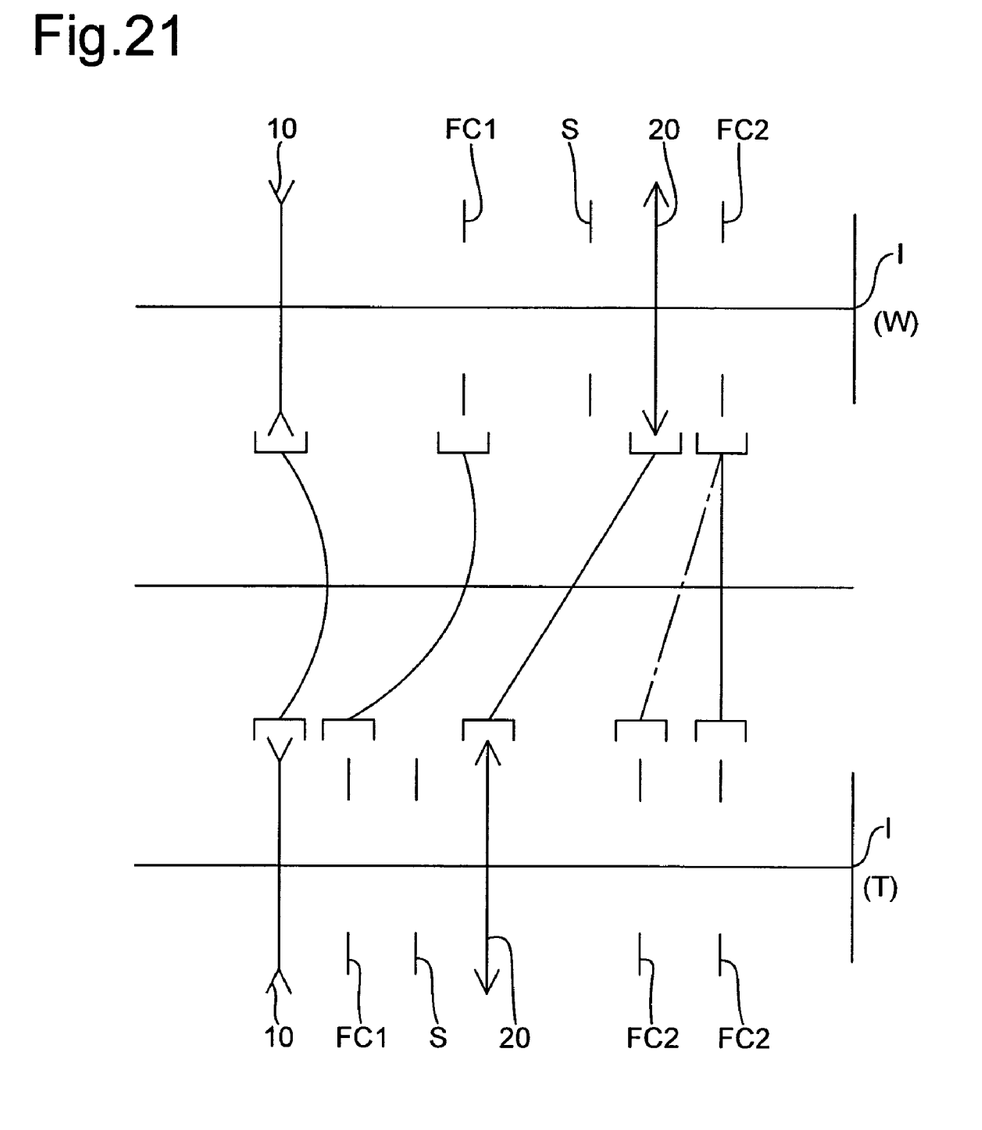
FIG. 21 is the schematic view of the lens-group moving paths for the zoom lens system according to the present invention.

The zoom lens system of the present invention, as shown in the zoom path of FIG. 21, includes a negative first lens group 10, a variable diaphragm S, and a positive second lens group 20, in this order from the object.

Upon zooming from the short focal length extremity (W) to the long focal length extremity (T), the negative first lens group 10 first moves toward the image and thereafter returns back toward to the object; and the positive second lens group 20 monotonically moves toward the object.

The variable diaphragm S moves together with the positive second lens group 20.

Focusing is performed by the negative first lens group 10. When focusing is being performed, the positive second lens group 20 is made stationary.

Separately from the variable diaphragm S, a flare-cut diaphragm FC1 is provided behind the negative first lens group 10 and in front of the variable diaphragm S; and a further flare-cut diaphragm FC2 is provided behind the positive second lens group 20.

The flare-cut diaphragm FC1 first moves toward the image and thereafter returns back toward to the object.

The further flare-cut diaphragm FC2 either remains stationary or monotonically moves toward the object. The chain line shown in FIG. 21 indicates the moving path of the further flare-cut diaphragm FC2 monotonically moving toward the object.

Here, note that the flare-cut diaphragm FC1 can be monotonically moved toward the object without being arranged to move toward the image unless the flare-cut diaphragm FC1 comes into contact with the negative first lens group 10 or the variable diaphragm S.

In the zoom lens system of the present invention, the negative first lens group 10 includes at least two positive lens elements and at least two negative lens elements.

With the two positive lens elements and the two negative lens elements in the negative first lens group 10, the correcting of aberrations can adequately be made, while a zoom ratio of approximately 3 is secured.

It is particularly preferable to arrange a positive first lens element, a negative second lens element, a negative third lens element and a positive fourth lens element in this order from the object.

Due to the above positive fourth lens element, the correcting of distortion can adequately be made. Furthermore, if a fifth lens element having weaker positive or negative refractive power is provided behind the positive fourth lens element, the correcting of various aberrations can more adequately be made.

Condition (1) is provided to correct aberrations, while the back focal distance is secured. By satisfying this condition, in addition to being able to secure a sufficient back focal distance, the correcting of aberrations can adequately be made even when the zoom lens system is miniaturized.

If |f1/fw| exceeds the upper limit of condition (1),the refractive power of the negative first lens group 10 becomes insufficient, i.e., the focal length of the negative first lens group 10 becomes longer. Consequently, the correcting of distortion becomes difficult.

The refractive power of the negative first lens group 10 becomes stronger to the extent that |f1/fw| exceeds the lower limit of condition (1), it is advantageous to secure the back focal distance; however, coma and astigmatism largely occur. Consequently, the number of lens elements in the zoom lens system has to be increased in order to attain optimum optical performance, and thereby the production costs increase and the size of the zoom lens system becomes larger.

Condition (2) specifies the refractive power of the positive second lens group 20 which is arranged to be moved for zooming.

If $f2/(fw \times ft)^{1/2}$ exceeds the upper limit of condition (2), the refractive power of the positive second lens group 20 becomes weaker, so that the zooming effect of the positive second lens group 20 becomes insufficient. Accordingly, the traveling distance of the positive second lens group 20 for the purpose of zooming has to be made longer in order to attain a predetermined zoom ratio; and the number of lens elements in the negative first lens group 10 has to be reduced. Consequently, the correcting of off-axis aberrations by the negative first lens group 10 becomes difficult.

If $f2/(fw \times ft)^{1/2}$ exceeds the lower limit of condition (2), the refractive power of the positive second lens group 20 becomes too strong. Consequently, the fluctuation of spherical aberration and that of coma upon zooming becomes larger, so that optimum optical performance cannot be attained.

Condition (3) specifies the ratio of the refractive power of the negative first lens group 10 to that of the positive second lens group 20.

In the case of a zoom lens system of the two-lens-group arrangement, i.e., the negative first lens group and the positive second lens group in this order from the object, the height a bundle of on-axis light rays is higher in the positive second lens group than in the negative first lens group, which means that spherical aberration tends to occur in the positive second lens group.

Therefore according to the zoom lens system of the present invention, the refractive power of the positive second lens group 20 is made slightly weaker than that of the negative first lens group 10. Namely, the refractive power distribution is well balanced over the lens groups so that aberrations (particularly, spherical aberration) occurred in the negative first lens group 10 and aberrations occurred in the positive second lens group 20 can be mutually cancelled out.

If $|f2/f1|$ exceeds the lower limit of condition (3), the refractive power of the positive second lens group 20 becomes too strong with respect to that of the negative first lens group 10. Consequently, aberrations (particularly, spherical aberration) occurred in the positive second lens group 20 cannot be canceled out by aberrations occurred in the negative first lens group 10.

If $|f2/f1|$ exceeds the upper limit of condition (3), the refractive power of the negative first lens group 10 becomes equal to or more than that of the positive second lens group 20. Consequently, aberrations (particularly, spherical aberration) occurred in the negative first lens group 10 cannot be canceled out by aberrations occurred in the positive second lens group 20.

In the zoom lens system of the present invention, the flare-cut diaphragm FC1 to limit the off-axis bundle of light rays is provided on the object-side of the positive second lens group 20. Due to this arrangement of the flare-cut diaphragm FC1, it becomes easier to correct off-axis aberrations at the short focal length extremity, and also becomes easier to make the diameter of the negative first lens group 10 smaller.

Furthermore, even in the case where the negative first lens group 10 is used as a focusing lens group, a decrease of the amount of peripheral illumination due to focusing can be prevented.

The flare-cut diaphragm FC1 is arranged to move together with the negative first lens group 10 (a focusing lens group) upon focusing. Due to this arrangement of the flare-cut diaphragm FC1, unnecessary light rays can be effectively eliminated, while the amount of peripheral illumination which is necessary for focusing an object at a shorter distance is secured.

Furthermore, the flare-cut diaphragm FC1 is positioned at an intermediate position between the negative first lens group 10 and the positive second lens group 20 for the purpose of avoiding a decrease of the amount of peripheral illumination by eliminating diagonal light rays and light rays carrying a taller intermediate image at the short focal length extremity. However, such a positioning of the flare-cut diaphragm FC1 may cause an undesirable contact with the negative first lens group 10 and the positive second lens group 20 upon zooming. Therefore, unlike the focusing operation, the flare-cut diaphragm FC1 is arranged to independently move relative to the negative first lens group 10 and the positive second lens group 20 upon zooming.

The further flare-cut diaphragm FC2 is positioned behind (on the image side of) the positive second lens group 20, so that unnecessary off-axis light rays on the side of the longer focal length can be effectively eliminated.

It is preferable to provide at least one aspherical surface in the negative first lens group 10. Due to the aspherical surface, distortion and astigmatism at the short focal length extremity in particular can be adequately corrected.

Specific numerical data of the embodiments will be described hereinafter.

In the diagrams of spherical aberration and the sine condition, SA designates spherical aberration, and SC designates the sine condition.

In the diagrams of chromatic aberration (axial chromatic aberration) represented by spherical aberration, the solid line and the two types of dotted lines respectively indicate spherical aberrations with respect to the d, g and C lines.

In the diagrams of lateral chromatic aberration, the two types of dotted lines respectively indicate magnification with respect to the g and C lines; however, the d line as the base line coincides with the ordinate.

In the diagrams of astigmatism, S designates the sagittal image, and M designates the meridional image.

The tables, FNO. designates the f-number, f designates the focal length of the entire zoom lens system, W designates the half angle-of-view (°), fB designates the back focal distance, r designates the radius of curvature, d designates the lens-element thickness or distance between lens elements, $N_d$ designates the refractive index of the d-line, and v designates the Abbe number.

In addition to the above, an aspherical surface which is symmetrical with respect to the optical axis is defined as follows:

$$x=cy^2/(1+[1-\{1+K\}c^2y^2]^{1/2})+A4y^4+A6y^6+A8y^8+A10y^{10}$$

wherein:

c designates a curvature of the aspherical vertex (1/r);

y designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

Embodiment 1

Figure 1:
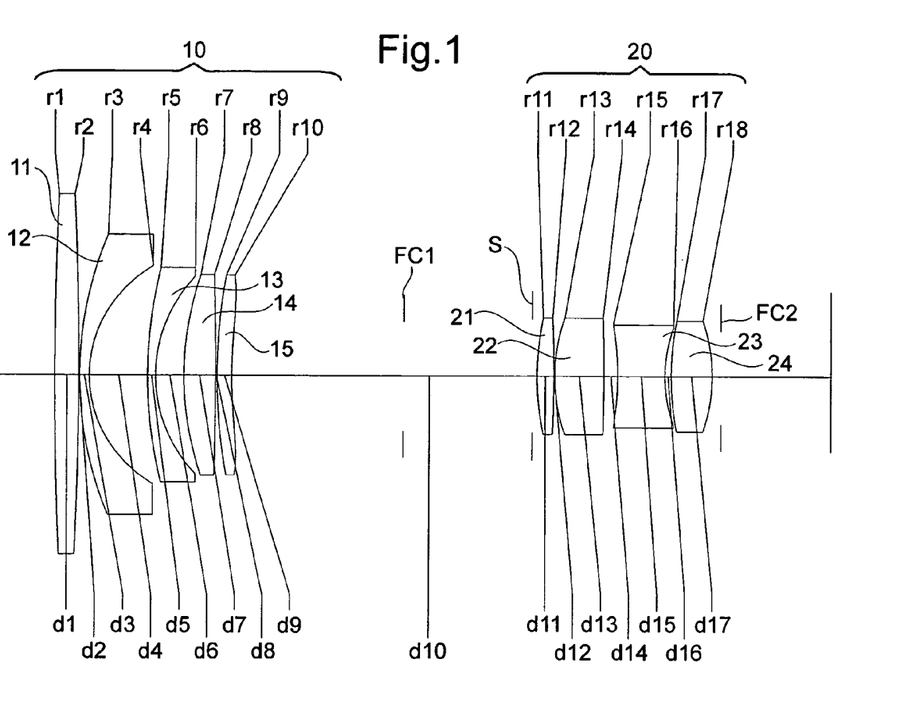
FIG. 1 is a lens arrangement of the zoom lens system, at the short focal length extremity, according to a first embodiment of the present invention.
Figure 2A:
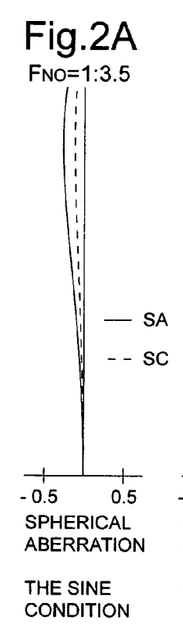
FIGS. 2A, 2B, 2C, 2D and 2E show aberrations occurred in the lens arrangement shown in FIG. 1.
Figures 2B, 2C:
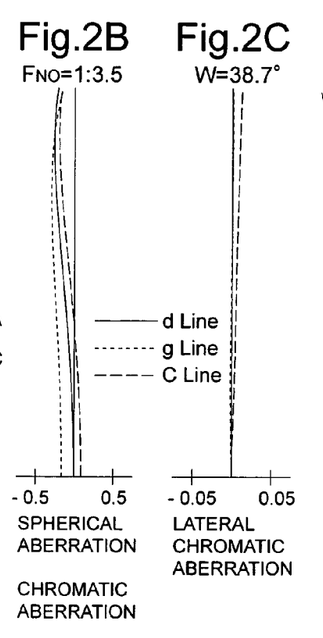
Figures 2D, 2E:
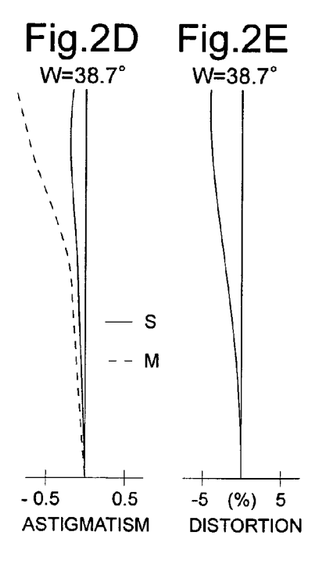
Figure 3:
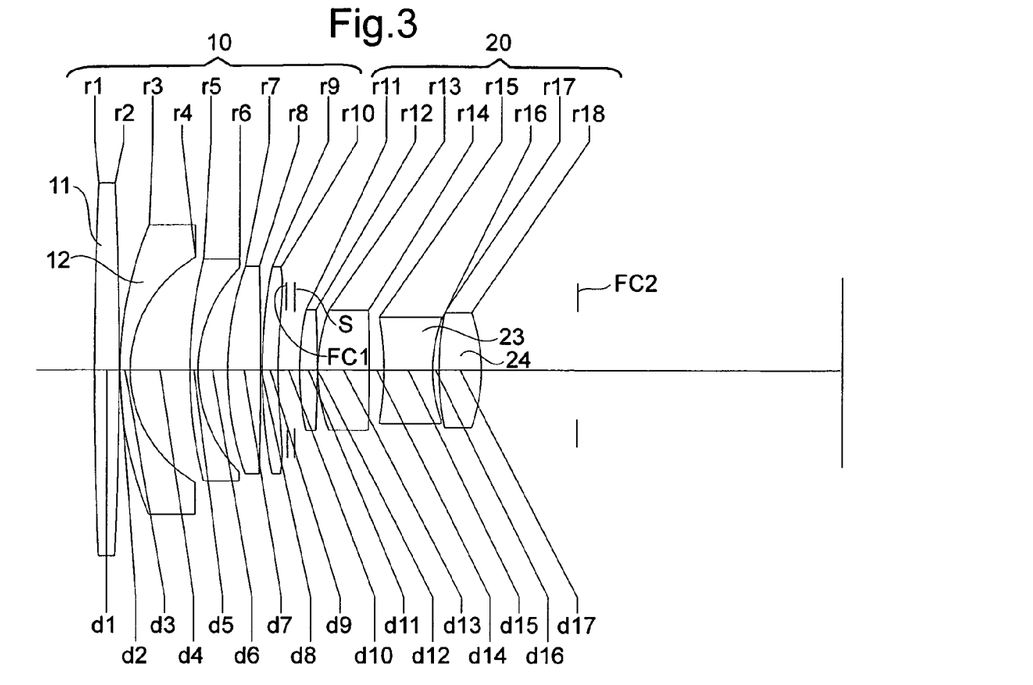
FIG. 3 is a lens arrangement of the zoom lens system, at the long focal length extremity, according to the first embodiment of the present invention.
Figure 4A:
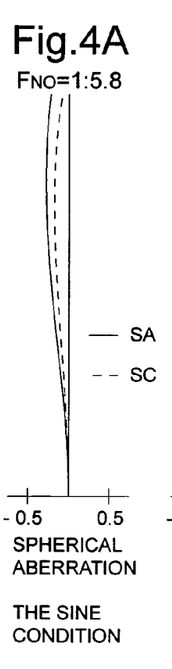
FIGS. 4A, 4B, 4C, 4D and 4E show aberrations occurred in the lens arrangement shown in FIG. 3.
Figures 4B, 4C:
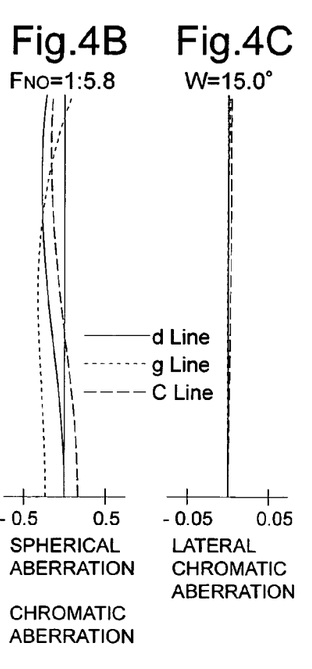
Figure 4D:
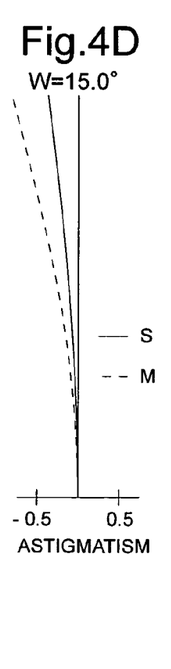
Figure 4E:
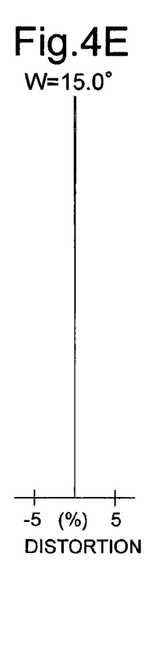

FIG. 1 is the lens arrangement of the zoom lens system at the short focal length extremity. FIGS. 2A through 2E show aberrations occurred in the lens arrangement shown in FIG. 1. FIG. 3 is the lens arrangement of the zoom lens system at the long focal length extremity. FIGS. 4A through 4E show aberrations occurred in the lens arrangement shown in FIG. 3. Table 1 shows the numerical data of the first embodiment.

The negative first lens group 10 includes a positive first lens element 11, a negative second lens element 12, a negative third lens element 13, a positive fourth lens element 14 and a negative fifth lens element 15, in this order from the object.

The positive second lens group 20 includes a positive lens element 21, a positive lens element 22, a negative lens element 23 and a positive lens element 24, in this order from the object.

The variable diaphragm S is positioned 0.60 in front of surface No. 11 (of the positive second lens group 20) and is arranged to move together with the positive second lens group 20 upon zooming.

The flare-cut diaphragm FC1 is positioned 16.23 behind surface No. 10 (of the negative first lens group 10) at the short focal length extremity, and 1.07 behind surface No. 10 at the long focal length extremity; and the height (radius) of the flare-cut diaphragm FC1 from the optical axis is 9.0.

The further flare-cut diaphragm FC2 is positioned 0.42 behind surface No. 18 (of the positive second lens group 20) at the short focal length extremity, and 11.45 behind surface No. 18 at the long focal length extremity; and the height (radius) of the further flare-cut diaphragm FC2 from the optical axis is 7.3. The further flare-cut diaphragm FC2 is arranged to move in the optical axis direction upon zooming.

TABLE 1

FNO. = 1: 3.5–5.8
f = 18.50–53.30
W = 38.7–15.0
fB = 37.42–74.16

| Surf. No. | r | d | Nd | ν |
|---|---|---|---|---|
| 1 | 509.738 | 3.06 | 1.62004 | 36.3 |
| 2 | −509.738 | 0.10 | — | — |
| 3 | 47.626 | 1.20 | 1.71300 | 53.9 |
| 4 | 16.299 | 7.36 | — | — |
| 5 | 57.087 | 1.00 | 1.69680 | 55.5 |
| 6 | 18.500 | 3.63 | — | — |
| 7 | 39.626 | 4.04 | 1.69895 | 30.1 |
| 8 | −497.937 | 0.20 | — | — |
| 9 | 71.551 | 1.90 | 1.52538 | 56.3 |
| 10* | 58.318 | 38.83–2.63 | — | — |
| 11 | 36.551 | 2.15 | 1.58913 | 61.2 |
| 12 | −167.832 | 0.10 | — | — |
| 13 | 22.262 | 6.27 | 1.51633 | 64.1 |
| 14 | −238.944 | 1.78 | — | — |
| 15 | −38.429 | 6.00 | 1.67270 | 32.1 |
| 16 | 18.321 | 0.80 | — | — |
| 17 | 36.503 | 5.30 | 1.51742 | 52.4 |
| 18 | −21.620 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 | A10 | A12 |
|---|---|---|---|---|---|---|
| 10 | 0.00 | $-0.27724 \times 10^{-4}$ | $-0.40939 \times 10^{-8}$ | $-0.84597 \times 10^{-9}$ | $0.48128 \times 10^{-11}$ | $-0.13019 \times 10^{-13}$ |

Embodiment 2

Figure 5:
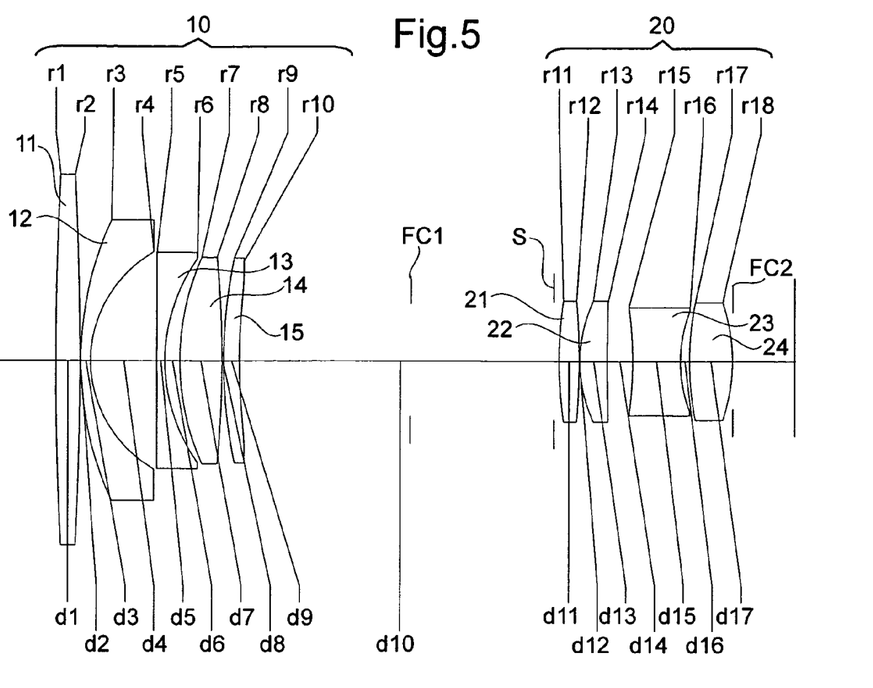
FIG. 5 is a lens arrangement of the zoom lens system, at the short focal length extremity, according to a second embodiment of the present invention.
Figure 6A:
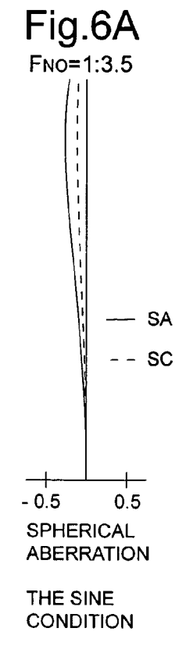
FIGS. 6A, 6B, 6C, 6D and 6E show aberrations occurred in the lens arrangement shown in FIG. 5.
Figure 6B:
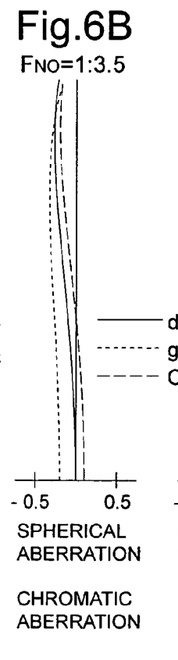
Figure 6C:
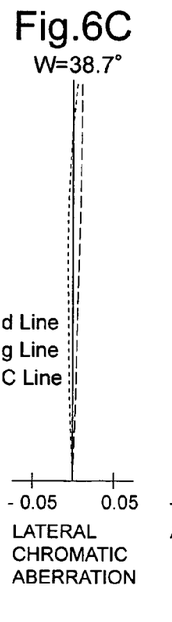
Figure 6D:
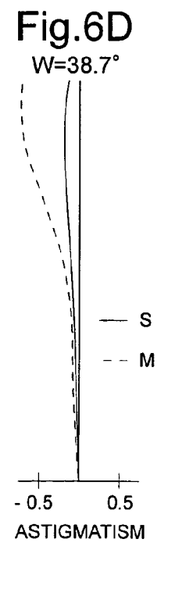
Figure 6E:
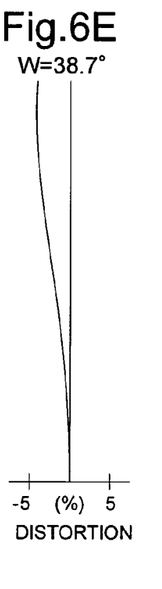
Figure 7:
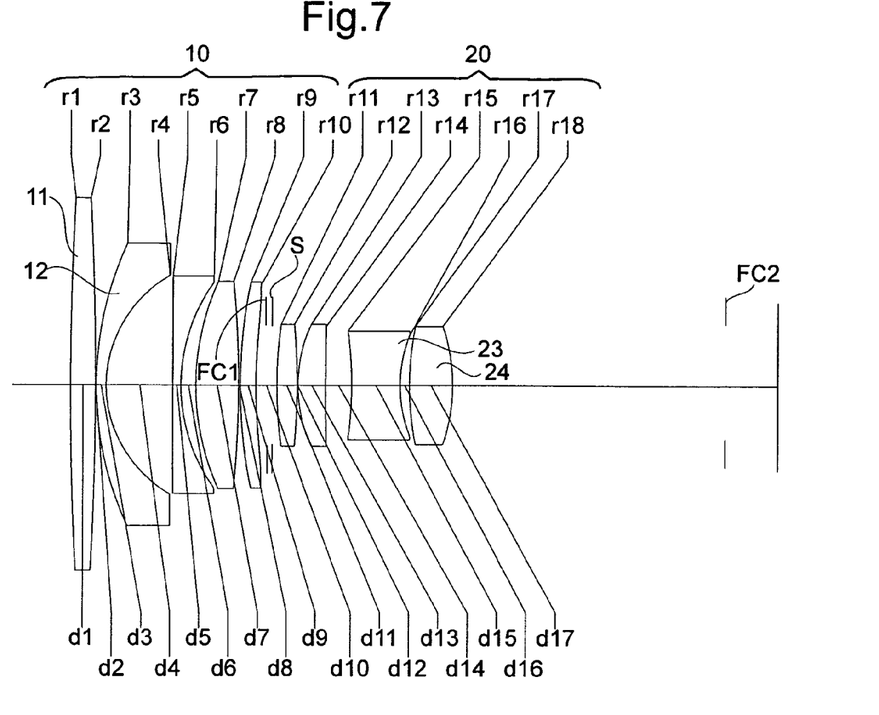
FIG. 7 is a lens arrangement of the zoom lens system, at the long focal length extremity, according to the second embodiment of the present invention.
Figure 8A:
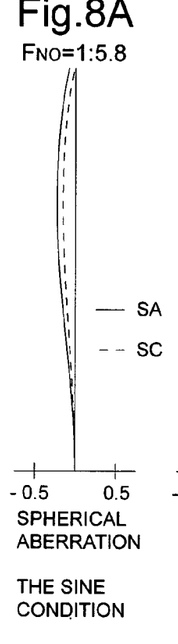
FIGS. 8A, 8B, 8C, 8D and 8E show aberrations occurred in the lens arrangement shown in FIG. 7.
Figure 8B:
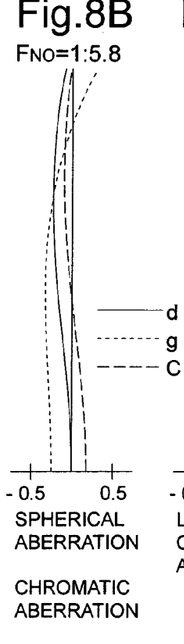
Figure 8C:
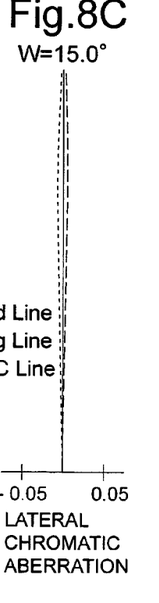
Figure 8D:
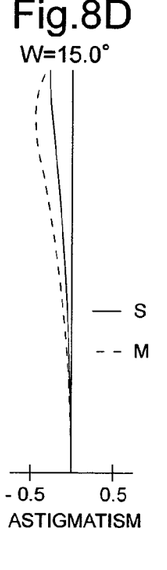
Figure 8E:
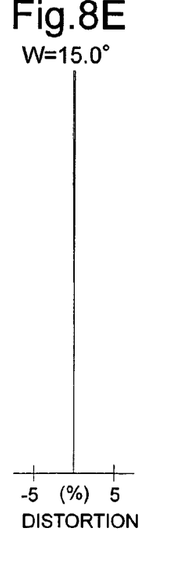

FIG. 5 is the lens arrangement of the zoom lens system at the short focal length extremity. FIGS. 6A through 6E show aberrations occurred in the lens arrangement shown in FIG. 5. FIG. 7 is a lens arrangement of the zoom lens system at the long focal length extremity. FIGS. 8A through 8E show aberrations occurred in the lens arrangement shown in FIG. 7. Table 2 shows the numerical data of the second embodiment.

The basic lens arrangement of the second embodiment is the same as that of the first embodiment.

The variable diaphragm S is positioned 0.60 in front of surface No. 11 (of the positive second lens group 20).

The flare-cut diaphragm FC1 is positioned 19.34 behind surface No. 10 (of the negative first lens group 10) at the short focal length extremity, and 1.00 behind surface No. 10 at the long focal length extremity; and the height (radius) the flare-cut diaphragm FC1 from the optical axis is 8.0.

The further flare-cut diaphragm FC2 is positioned 0.63 behind surface No. 18 (of the positive second lens group 20) at the short focal length extremity, and 37.34 behind surface No. 18 at the long focal length extremity; the height (radius) the further flare-cut diaphragm FC2 from the optical axis is 9.0. The further flare-cut diaphragm FC2 remains stationary upon zooming.

TABLE 2

FNO. = 1: 3.5–5.8
f = 18.50–53.30
W = 38.7–15.0
fB = 37.63–74.34

| Surf. No. | r | d | Nd | ν |
|---|---|---|---|---|
| 1 | 444.292 | 3.06 | 1.69895 | 30.1 |
| 2 | −444.292 | 0.10 | — | — |
| 3 | 42.708 | 1.20 | 1.80400 | 46.6 |
| 4 | 15.736 | 8.17 | — | — |
| 5 | 3776.523 | 1.00 | 1.69680 | 55.5 |
| 6 | 22.220 | 1.84 | — | — |
| 7 | 31.745 | 5.22 | 1.66680 | 33.0 |
| 8 | −140.405 | 0.20 | — | — |
| 9 | 64.463 | 1.90 | 1.52538 | 56.3 |
| 10* | 62.546 | 39.43–2.60 | — | — |
| 11 | 54.135 | 2.49 | 1.58913 | 61.2 |
| 12 | −87.008 | 0.10 | — | — |
| 13 | 18.098 | 3.40 | 1.51633 | 64.1 |
| 14 | 304.893 | 3.19 | — | — |
| 15 | −48.503 | 5.90 | 1.67270 | 32.1 |
| 16 | 17.164 | 1.15 | — | — |
| 17 | 37.978 | 5.30 | 1.51742 | 52.4 |
| 18 | −22.940 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 | A10 | A12 |
|---|---|---|---|---|---|---|
| 10 | 0.00 | $-0.20822 \times 10^{-4}$ | $0.19203 \times 10^{-7}$ | $-0.94078 \times 10^{-9}$ | $0.560152 \times 10^{-11}$ | $-0.13718 \times 10^{-13}$ |

Embodiment 3

Figure 9:
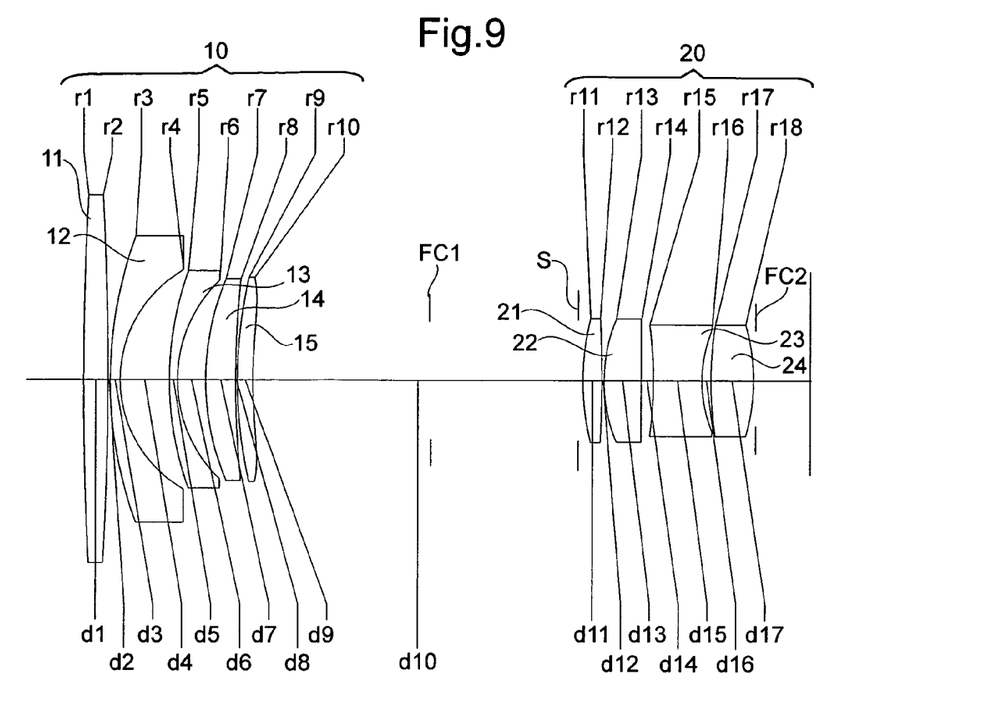
FIG. 9 is a lens arrangement of the zoom lens system, at the short focal length extremity, according to a third embodiment of the present invention.
Figure 10A:
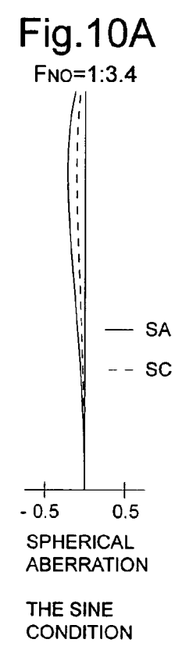
FIGS. 10A, 10B, 10C, 10D and 10E show aberrations occurred in the lens arrangement shown in FIG. 9.
Figures 10B, 10C:
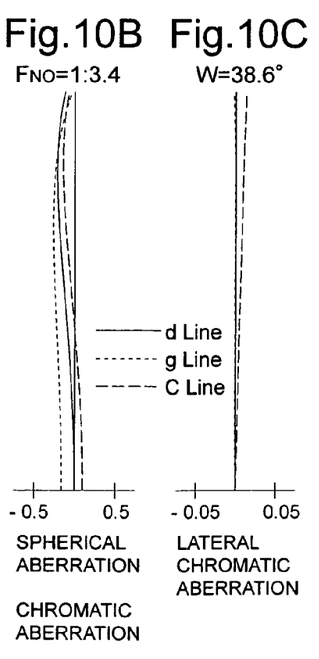
Figure 10D:
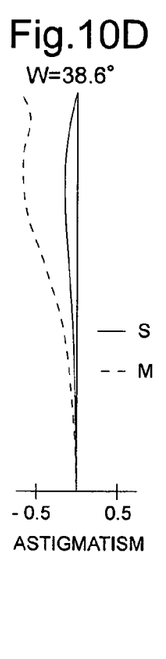
Figure 10E:
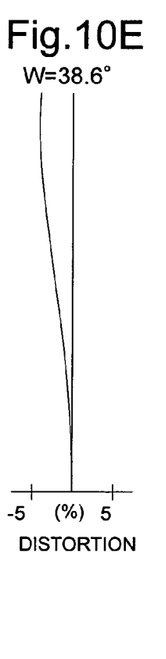
Figure 11:
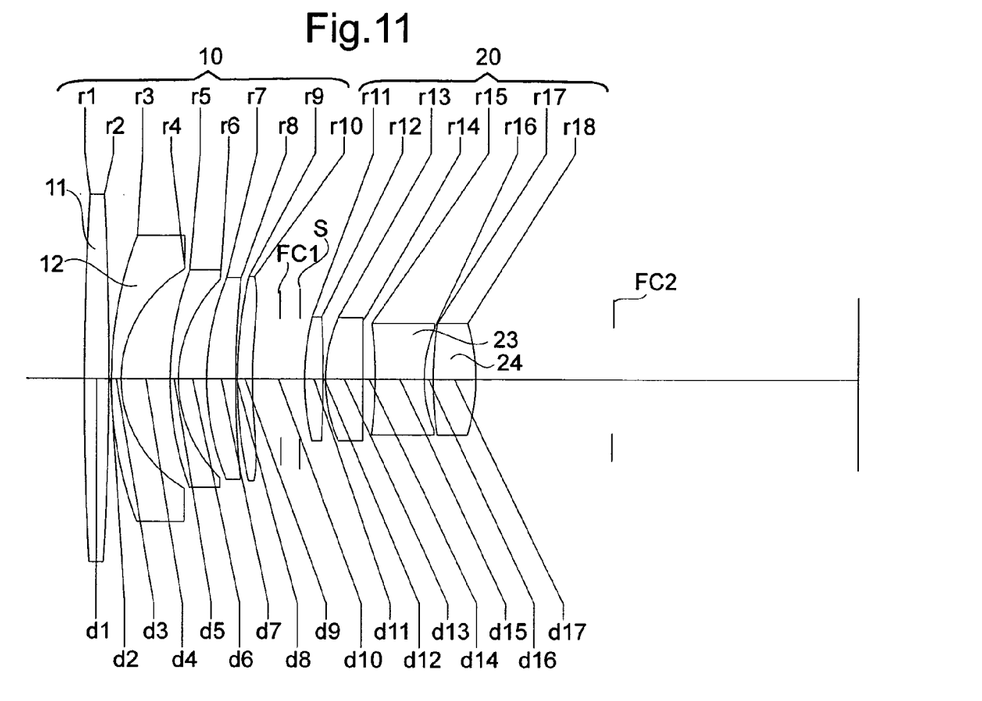
FIG. 11 is a lens arrangement of the zoom lens system, at the long focal length extremity, according to the third embodiment of the present invention.
Figures 12A, 12B, 12C:
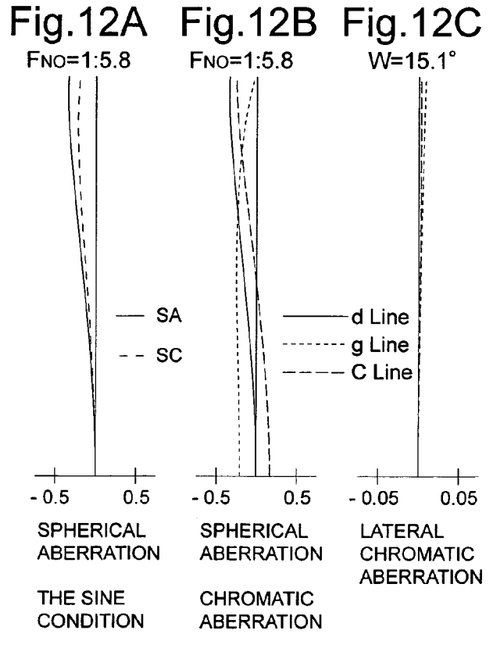
FIGS. 12A, 12B, 12C, 12D and 12E show aberrations occurred in the lens arrangement shown in FIG. 11.
Figure 12D:
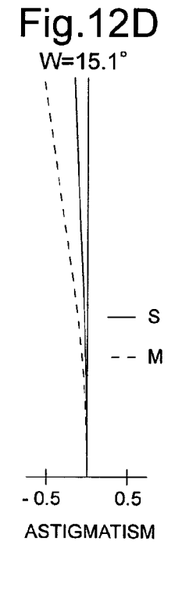
Figure 12E:
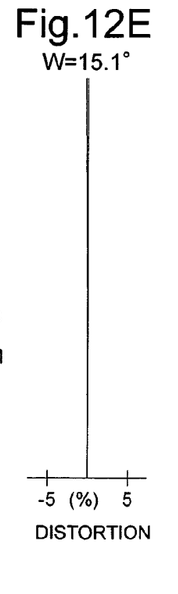

FIG. 9 is the lens arrangement of the zoom lens system at the short focal length extremity. FIGS. 10A through 10E show aberrations occurred in the lens arrangement shown in FIG. 9. FIG. 11 is the lens arrangement of the zoom lens system at the long focal length extremity. FIGS. 12A through 12E show aberrations occurred in the lens arrangement shown in FIG. 11. Table 3 shows the numerical data of the third embodiment.

The negative first lens group 10 includes a positive first lens element 11, a negative second lens element 12, a negative third lens element 13, a positive fourth lens element 14 and a positive fifth lens element 15, in this order from the object.

The positive second lens group 20 includes a positive lens element 21, a positive lens element 22, a negative lens element 23 and a positive lens element 24, in this order from the object.

The variable diaphragm S is positioned 0.60 in front of surface No. 11 (of the positive second lens group 20) and is arranged to move together with the positive second lens group 20 upon zooming.

The flare-cut diaphragm FC1 is positioned 20.67 behind surface No. 10 (of the negative first lens group 10) at the short focal length extremity, and 2.59 behind surface No. 10 at the long focal length extremity; and the height (radius) of the flare-cut diaphragm FC1 from the optical axis is 7.7.

The further flare-cut diaphragm FC2 is positioned 0.00 behind surface No. 18 (of the positive second lens group 20) at the short focal length extremity, and 11.04 behind surface No. 18 at the long focal length extremity; and the height (radius) of the further flare-cut diaphragm FC2 from the optical axis is 7.2. The further flare-cut diaphragm FC2 is arranged to move in the optical axis direction upon zooming.

Embodiment 4

Figure 13:
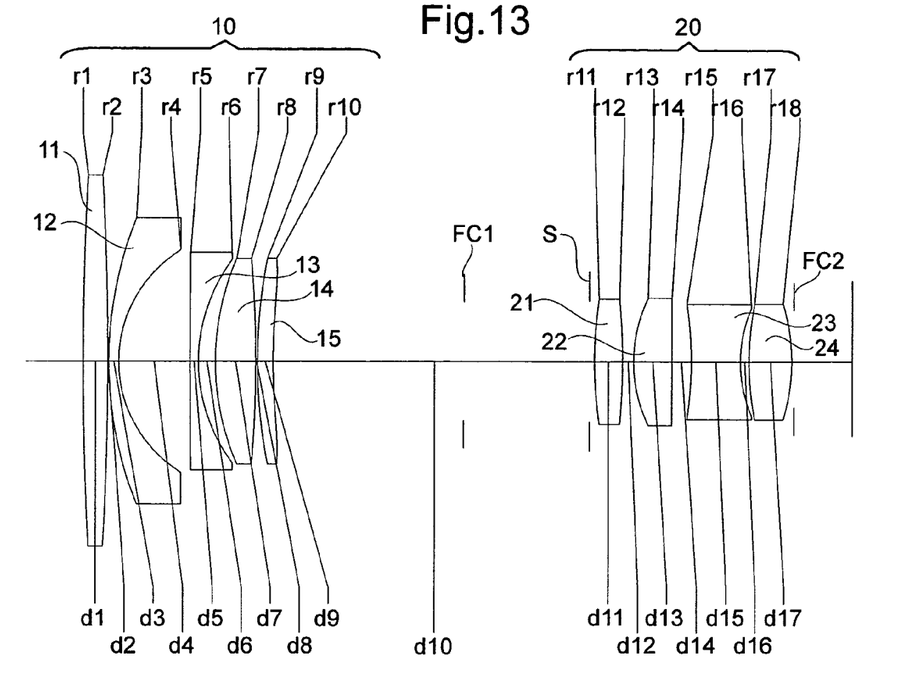
FIG. 13 is a lens arrangement of the zoom lens system, at the short focal length extremity, according to a fourth embodiment of the present invention.
Figure 14A:
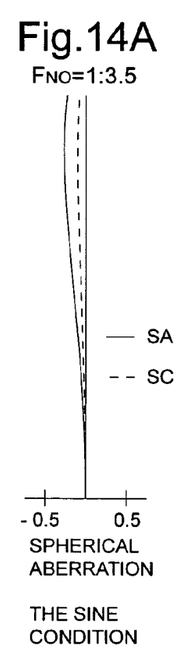
FIGS. 14A, 14B, 14C, 14D and 14E show aberrations occurred in the lens arrangement shown in FIG. 13.
Figure 14B:
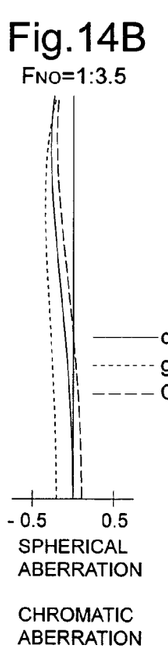
Figure 14C:
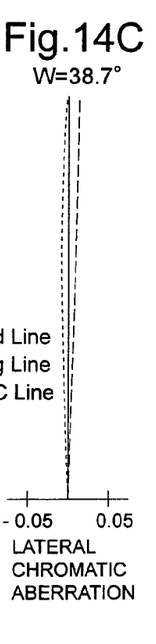
Figure 14D:
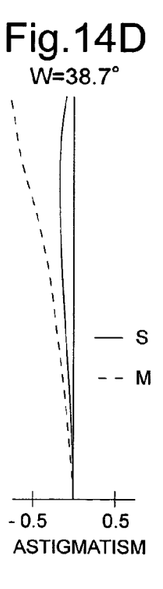
Figure 14E:
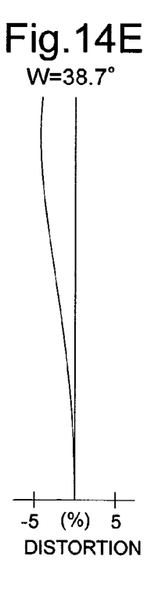
Figure 15:
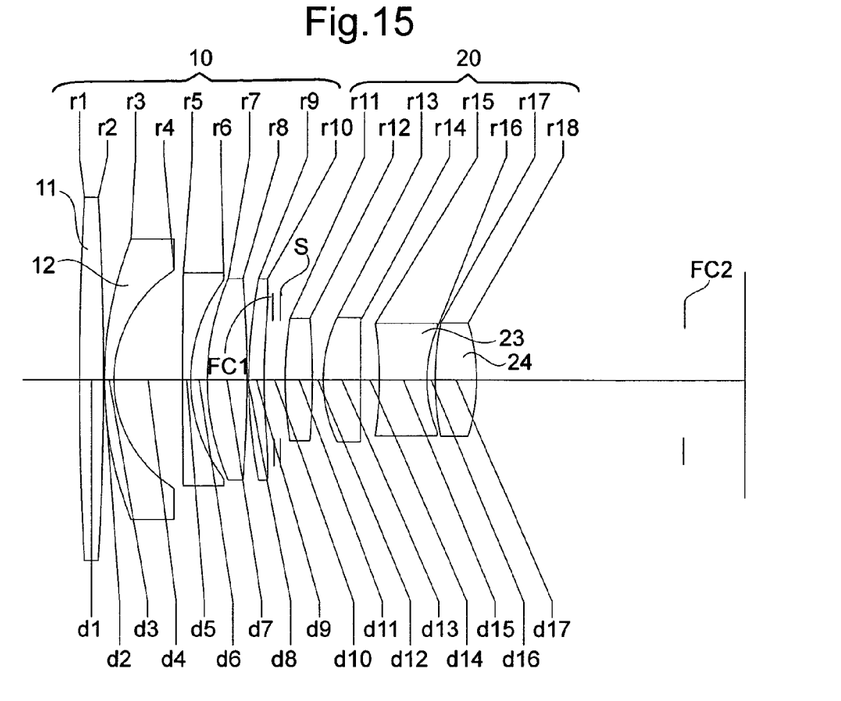
FIG. 15 is a lens arrangement of the zoom lens system, at the long focal length extremity, according to the fourth embodiment of the present invention.
Figure 16A:
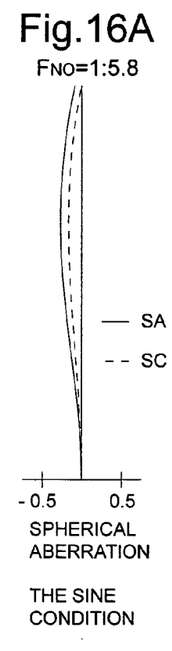
FIGS. 16A, 16B, 16C, 16D and 16E show aberrations occurred in the lens arrangement shown in FIG. 15.
Figures 16B, 16C:
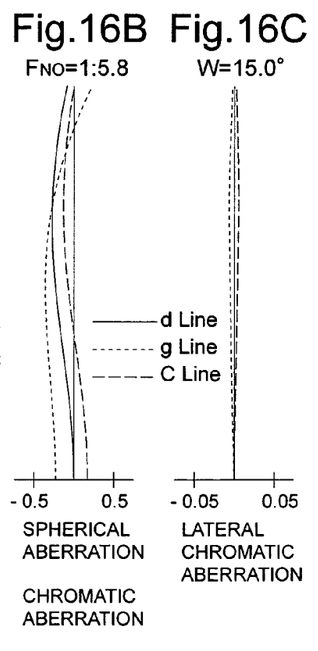
Figure 16D:
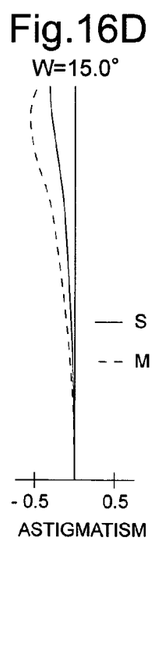
Figure 16E:
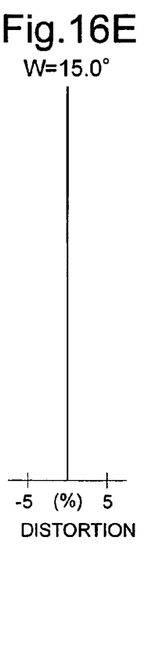

FIG. 13 is the lens arrangement of the zoom lens system at the short focal length extremity. FIGS. 14A through 14E show aberrations occurred in the lens arrangement shown in FIG. 13. FIG. 15 is the lens arrangement of the zoom lens system at the long focal length extremity. FIGS. 16A through 16E show aberrations occurred in the lens arrangement shown in FIG. 15.

The basic lens arrangement of the second embodiment is the same as that of the third embodiment.

The variable diaphragm S is positioned 0.60 in front of surface No. 11 (of the positive second lens group 20).

The flare-cut diaphragm FC1 is positioned 20.00 behind surface No. 10 (of the negative first lens group 10) at the short focal length extremity, and 0.45 behind surface No. 10 at the long focal length extremity; and the height (radius) the flare-cut diaphragm FC1 from the optical axis is 7.5.

The further flare-cut diaphragm FC2 is positioned 0.42 behind surface No. 18 (of the positive second lens group 20) at the short focal length extremity, and 38.01 behind surface No. 18 at the long focal length extremity; the height (radius) the further flare-cut diaphragm FC2 from the optical axis is 9.0. The further flare-cut diaphragm FC2 remains stationary upon zooming.

TABLE 3

FNO. = 1: 3.4–5.8
f = 18.60–53.00
W = 38.6–15.1
fB = 37.40–74.18

| Surf. No. | r | d | Nd | ν |
|---|---|---|---|---|
| 1 | 417.869 | 3.06 | 1.64769 | 33.8 |
| 2 | −417.869 | 0.30 | — | — |
| 3 | 52.769 | 1.20 | 1.71300 | 53.9 |
| 4 | 16.014 | 6.10 | — | — |
| 5 | 40.377 | 1.00 | 1.78964 | 44.6 |
| 6 | 17.579 | 3.48 | — | — |
| 7 | 33.220 | 3.68 | 1.80094 | 25.5 |
| 8 | 129.960 | 0.20 | — | — |
| 9 | 58.685 | 1.90 | 1.52538 | 56.3 |
| 10* | 58.914 | 41.03–6.40 | — | — |
| 11 | 33.947 | 2.31 | 1.60311 | 60.7 |
| 12 | −150.945 | 0.28 | — | — |
| 13 | 20.221 | 4.58 | 1.53005 | 65.2 |
| 14 | 3654.436 | 1.53 | — | — |
| 15 | −54.618 | 6.00 | 1.67270 | 32.1 |
| 16 | 16.779 | 1.13 | — | — |
| 17 | 44.964 | 5.30 | 1.51742 | 52.4 |
| 18 | −25.303 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 | A10 | A12 |
|---|---|---|---|---|---|---|
| 10 | 0.00 | $-0.29175 \times 10^{-4}$ | $-0.36407 \times 10^{-7}$ | $-0.70866 \times 10^{-9}$ | $0.55257 \times 10^{-11}$ | $-0.19195 \times 10^{-13}$ |

TABLE 4

FNO. = 1:3.5–5.8
f = 18.50–53.30
W = 38.7–15.0
fB = 37.42–75.01

| Surf. No. | r | d | Nd | ν |
|---|---|---|---|---|
| 1 | 407.941 | 3.06 | 1.69895 | 30.1 |
| 2 | −407.941 | 0.10 | — | — |
| 3 | 48.376 | 1.20 | 1.78590 | 44.2 |
| 4 | 16.417 | 8.72 | — | — |
| 5 | 1198.213 | 1.00 | 1.69680 | 55.5 |
| 6 | 21.285 | 2.09 | — | — |
| 7 | 32.387 | 4.97 | 1.67270 | 32.1 |
| 8 | −159.850 | 0.20 | — | — |
| 9 | 67.012 | 1.90 | 1.52538 | 56.3 |
| 10* | 69.759 | 39.60–2.60 | — | — |
| 11 | 53.885 | 3.38 | 1.58913 | 61.2 |
| 12 | −90.697 | 1.33 | — | — |
| 13 | 18.647 | 4.68 | 1.51633 | 64.1 |
| 14 | 3977.679 | 2.34 | — | — |
| 15 | −50.466 | 6.00 | 1.67270 | 32.1 |
| 16 | 17.241 | 1.05 | — | — |
| 17 | 37.628 | 5.27 | 1.51742 | 52.4 |
| 18 | −24.635 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 | A10 | A12 |
|---|---|---|---|---|---|---|
| 10 | 0.00 | $-0.21102 \times 10^{-4}$ | $0.27400 \times 10^{-7}$ | $-0.92284 \times 10^{-9}$ | $0.52448 \times 10^{-11}$ | $-0.12658 \times 10^{-13}$ |

Embodiment 5

Figure 17:
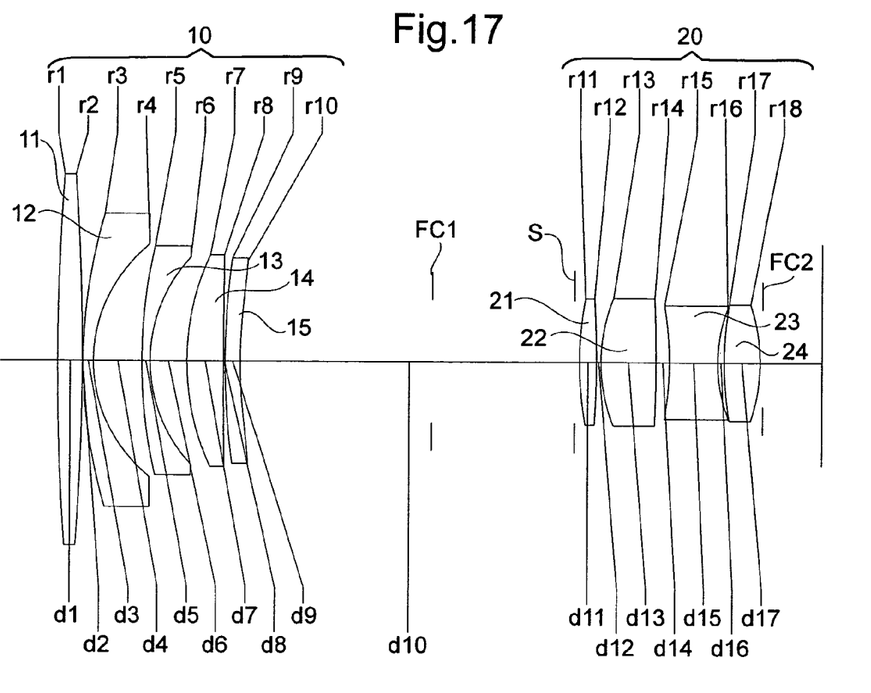
FIG. 17 is a lens arrangement of the zoom lens system, at the short focal length extremity, according to a fifth embodiment of the present invention.
Figure 18A:
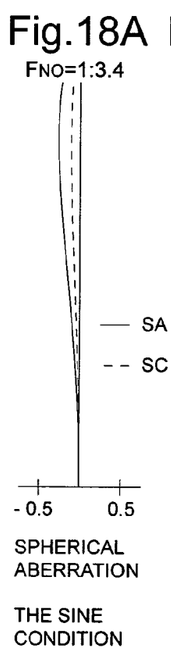
FIGS. 18A, 18B, 18C, 18D and 18E show aberrations occurred in the lens arrangement shown in FIG. 17.
Figure 18B:
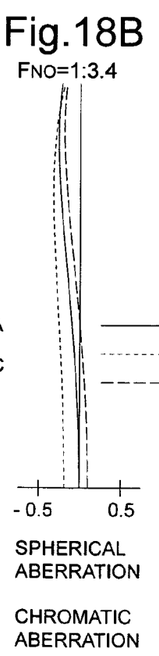
Figure 18C:
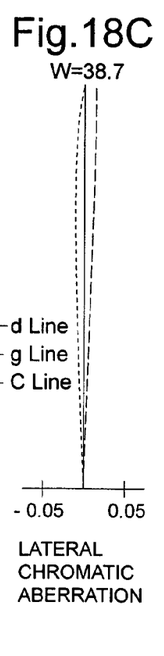
Figure 18D:
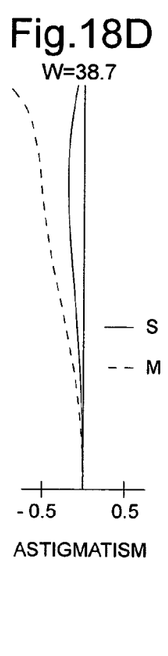
Figure 18E:
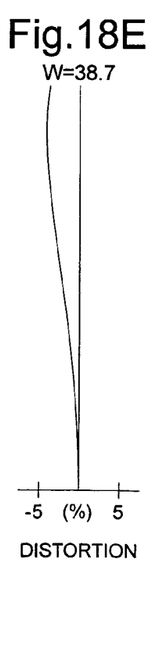
Figure 19:
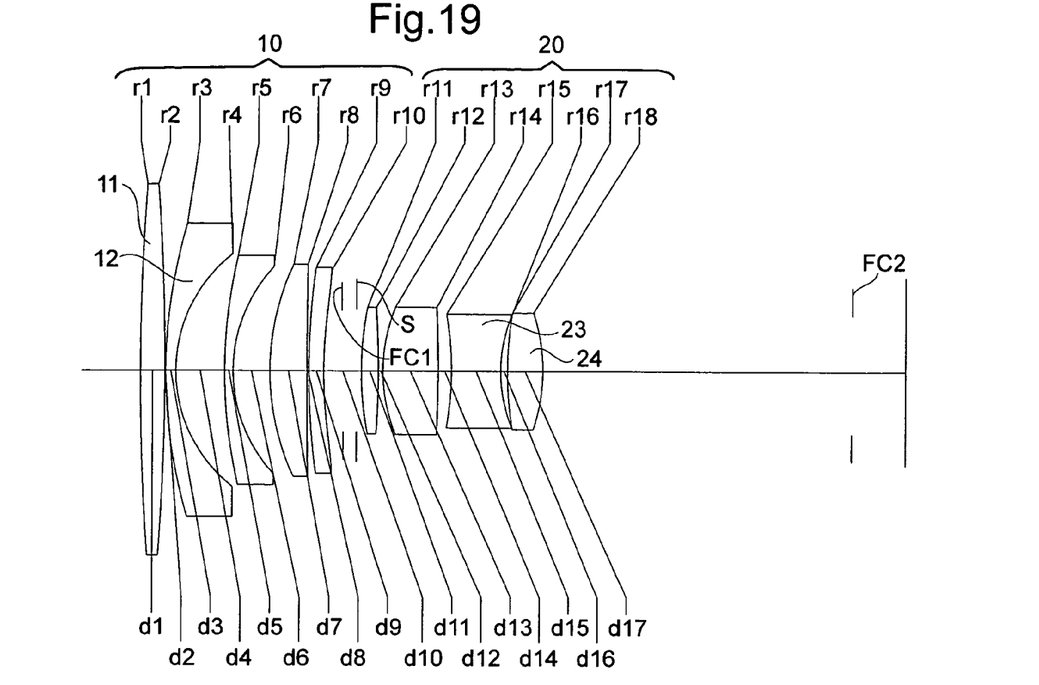
FIG. 19 is a lens arrangement of the zoom lens system, at the long focal length extremity, according to the fifth embodiment of the present invention.
Figure 20A:
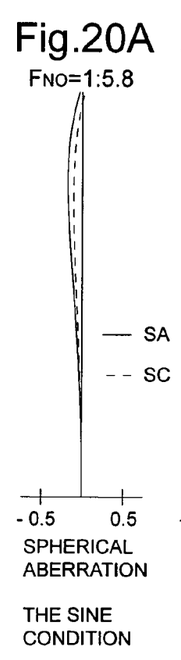
FIGS. 20A, 20B, 20C, 20D and 20E show aberrations occurred in the lens arrangement shown in FIG. 19.
Figures 20B, 20C:
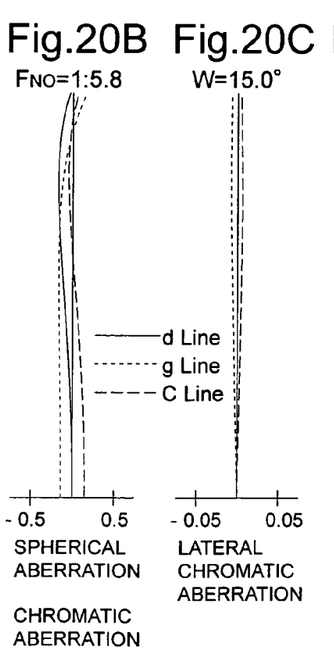
Figure 20D:
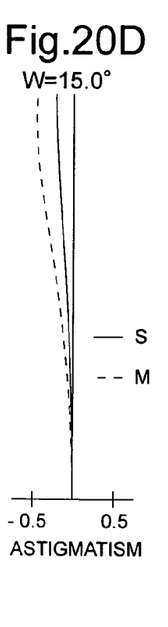
Figure 20E:
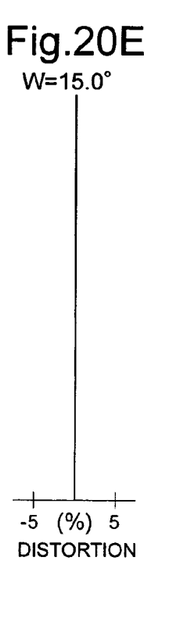

FIG. 17 is the lens arrangement of the zoom lens system at the short focal length extremity. FIGS. 18A through 18E show aberrations occurred in the lens arrangement shown in FIG. 17. FIG. 19 is the lens arrangement of the zoom lens system at the long focal length extremity. FIGS. 20A through 20E show aberrations occurred in the lens arrangement shown in FIG. 19. Table 5 shows the numerical data of the fifth embodiment.

The basic lens arrangement of the second embodiment is the same as that of the first embodiment.

The variable diaphragm S is positioned 0.60 in front of surface No. 11 (of the positive second lens group 20).

The flare-cut diaphragm FC1 is positioned 20.91 behind surface No. 10 (of the negative first lens group 10) at the short focal length extremity, and 1.75 behind surface No. 10 at the long focal length extremity; and the height (radius) the flare-cut diaphragm FC1 from the optical axis is 7.6.

The further flare-cut diaphragm FC2 is positioned 0.40 behind surface No. 18 (of the positive second lens group 20) at the short focal length extremity, and 37.24 behind surface No. 18 at the long focal length extremity; the height (radius) the further flare-cut diaphragm FC2 from the optical axis is 9.0. The further flare-cut diaphragm FC2 remains stationary upon zooming.

TABLE 5

FNO. = 1:3.4–5.8
f = 18.50–53.30
W = 38.7–15.0
fB = 37.40–74.24

| Surf. No. | r | d | Nd | ν |
|---|---|---|---|---|
| 1 | 312.109 | 3.01 | 1.69895 | 30.1 |
| 2 | −312.109 | 0.10 | — | — |
| 3 | 64.488 | 1.20 | 1.80610 | 40.9 |
| 4 | 18.496 | 5.94 | — | — |
| 5 | 62.964 | 1.00 | 1.69680 | 55.5 |
| 6 | 19.094 | 4.46 | — | — |
| 7 | 31.531 | 4.47 | 1.69895 | 30.1 |
| 8 | 944.830 | 0.20 | — | — |
| 9 | 94.199 | 1.80 | 1.52538 | 56.3 |
| 10* | 53.793 | 41.51–4.59 | — | — |
| 11 | 42.430 | 2.06 | 1.58913 | 61.2 |
| 12 | −128.075 | 0.54 | — | — |
| 13 | 21.280 | 6.75 | 1.51633 | 64.1 |
| 14 | −190.813 | 1.63 | — | — |
| 15 | −41.497 | 6.00 | 1.67270 | 32.1 |
| 16 | 18.552 | 0.83 | — | — |
| 17 | 42.120 | 4.37 | 1.51742 | 52.4 |
| 18 | −23.252 | — | — | — |

The symbol * designates the aspherical surface which is rotationally symmetrical with respect to the optical axis.

Aspherical surface data (the aspherical surface coefficients not indicated are zero (0.00)):

The numerical values of each condition for each embodiment are shown in Table 6.

TABLE 6

| | Embod. 1 | Embod. 2 | Embod. 3 | Embod. 4 | Embod. 5 |
|---|---|---|---|---|---|
| Cond. (1) | 1.68 | 1.70 | 1.64 | 1.68 | 1.70 |
| Cond. (2) | 1.05 | 1.06 | 1.04 | 1.07 | 1.06 |
| Cond. (3) | 1.06 | 1.06 | 1.07 | 1.08 | 1.06 |

As can be understood from Table 6, each of the first through fifth embodiments satisfy conditions (1) through. Furthermore, as can be understood from the aberration diagrams, the various aberrations are adequately corrected.

According to the above description, the zoom lens system with the following features can be obtained:

(i) the angle-of-view of 75° or more is attained;

(ii) the zoom ratio is 3 or more;

(iii) the focal length at the short focal length extremity is longer, compared to the back focal distance;

(iv) off-axis aberrations at the short focal length extremity and the on-axis aberrations at the long focal length extremity are maintained in a well balanced manner, while peripheral illumination at the short focal length extremity is secured; and (v) the zoom lens system is miniaturized with lower production costs.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprises a negative first lens group, a variable diaphragm, a positive second lens group, in this order from an object, wherein zooming is performed by moving said negative first lens group and said positive second lens group;

wherein said negative first lens group comprises at least two negative lens elements and at least two positive lens elements; and wherein said zoom lens system satisfies the following conditions:

$$1.5 < |f1/fw| < 1.8$$

$$1.0 < f2/(fw \times ft)^{1/2} < 1.3$$

$$1.0 < |f2/f1| < 1.2$$

wherein f1 designates the focal length of said negative first lens group;

f2 designates the focal length of said positive second lens group;

| Surf. No. | K | A4 | A6 | A8 | A10 | A12 |
|---|---|---|---|---|---|---|
| 10 | 0.00 | −0.16052 × 10⁻⁴ | −0.27457 × 10⁻⁷ | 0.20213 × 10⁻¹⁰ | −0.34272 × 10⁻¹² | 0.21019 × 10⁻¹⁵ | fw designates the focal length of the entire the zoom lens system at the short focal length extremity; and ft designates the focal length of the entire the zoom lens system at the long focal length extremity.

2. The zoom lens system according to claim 1, further comprising a flare-cut diaphragm provided between said negative first lens group and said variable diaphragm, wherein upon focusing, said positive second lens group is made immovable, and said flare-cut diaphragm is arranged to move together with said negative first lens group.

3. The zoom lens system according to claim 1, further comprising a flare-cut diaphragm provided between said negative first lens group and said variable diaphragm, wherein said flare-cut diaphragm is made independently movable, upon zooming, with respect to said negative first lens group and said variable diaphragm.

4. The zoom lens system according to claim 1, wherein said negative first lens group comprises a positive first lens element, a negative second lens element, a negative third lens element and a positive fourth lens element, in this order from the object.

5. The zoom lens system according to claim 4, wherein said negative first lens group further comprises a positive or negative lens element that is provided on an image side of said positive fourth lens element.

* * * * *